May 19, 1931. D. W. VOORHEES, JR 1,806,271
STEEL TRUCK
Filed July 10, 1930 2 Sheets-Sheet 1
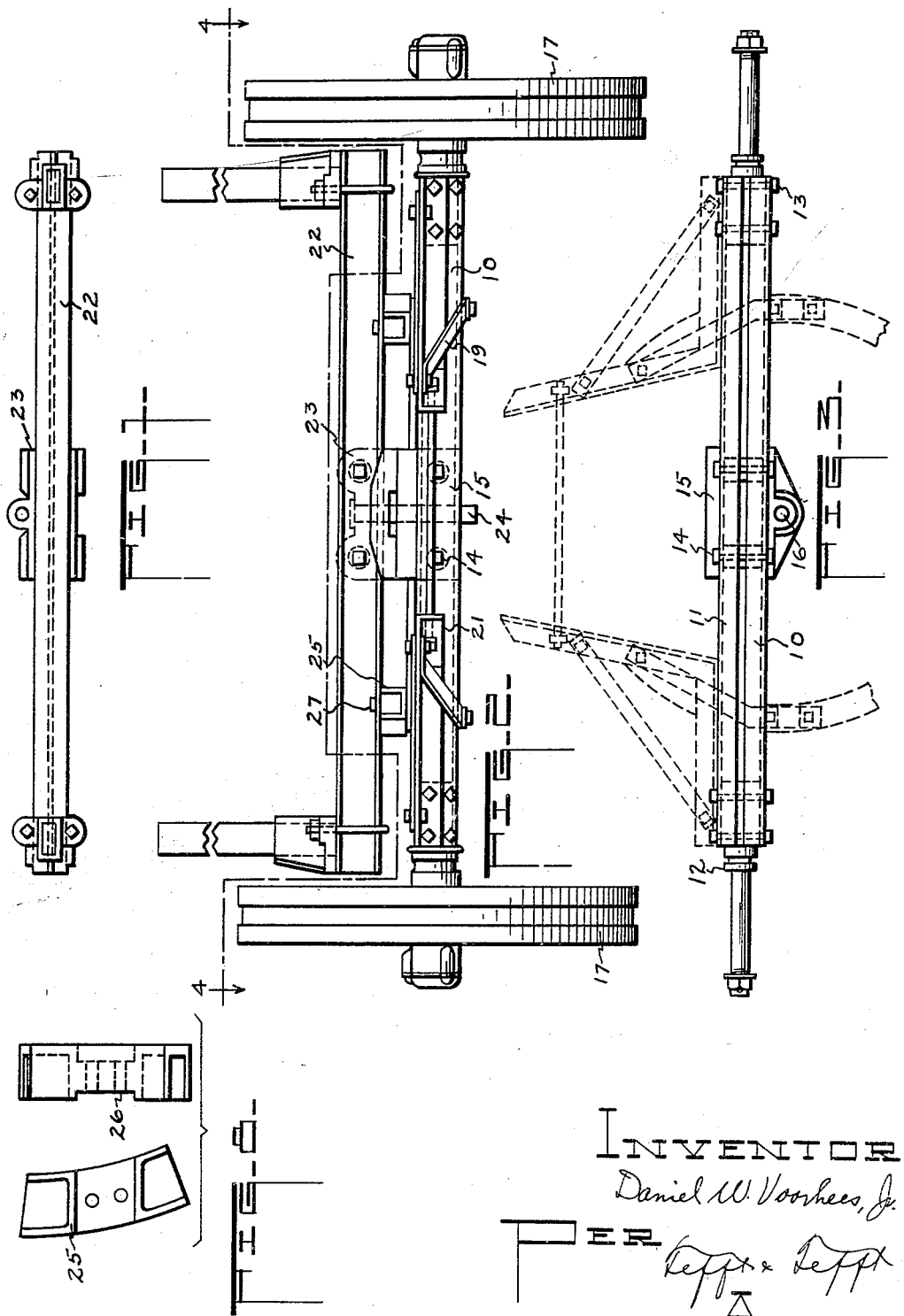

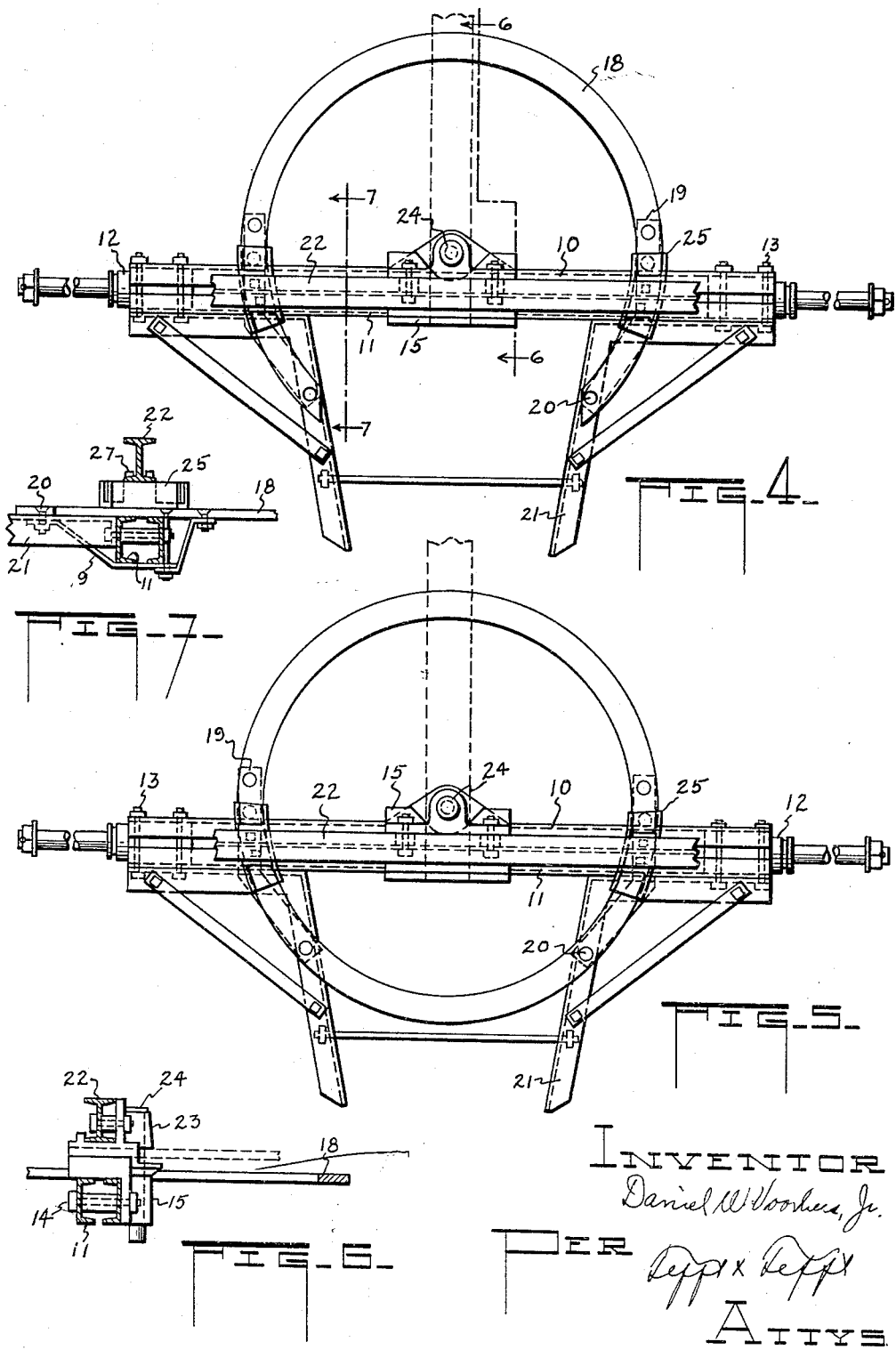

Patented May 19, 1931

1,806,271

UNITED STATES PATENT OFFICE

DANIEL W. VOORHEES, JR., OF PERU, ILLINOIS

STEEL TRUCK

Application filed July 10, 1930. Serial No. 466,973.

This invention relates to steel trucks.

One of the objects of the invention lies in the provision of a steel truck, wherein the wagon frame or bolster is pivoted to the axle at an intermediate point but in such manner as to prevent tipping of the wagon bolster with respect to the axle.

Another object lies in the provision of steel truck mechanism wherein the wagon bolster is pivoted to the axle assembly, there being also provided lug members secured to the bolster and rideable upon a member attached to the steel axle to prevent tipping of the bolster with respect thereto.

Still another object lies in the provision of a steel truck assembly, which comprises an axle member having a circular or partially circular plate fixedly secured thereto, a pivoted wagon frame or bolster suspended thereabove, and members adjustably secured to the wagon bolster in such manner as to be ridable upon the above mentioned circular portion to prevent tipping of the bolster with respect to the axle.

Other objects will appear in the following specification taken in connection with the annexed drawings, in which—

Fig. 1 is a plan view of the wagon bolster;

Fig. 2 is a front elevational view of the steel truck;

Fig. 3 is a plan view from below of the truck;

Fig. 4 is a sectional view taken on the line 4—4 of Fig. 1;

Fig. 5 is a similar view to that shown in Fig. 4, with the exception that the partially circular member attached to the axle in this instance comprises a complete circle;

Fig. 6 is a sectional view taken on the line 6—6 of Fig. 4;

Fig. 7 is a cross-sectional view taken on the line 7—7 of Fig. 4; and

Fig. 8 is a plan and side view of applicant's detachable non-tipping lug mechanism.

Before referring specifically to the drawings, it might be stated that the applicant herein has been for some years past extremely active in the development of steel trucks, which have been designed to decrease the weight and at the same time increase the strength and sturdiness of the truck.

The particular and peculiar method of utilizing channel and angle steel has resulted in a great increase in the production of trucks, at the same time with a minimum cost heretofore impossible.

The present application is directed specifically to the manner of associating the wagon frame or the bolster with the axle. In Fig. 1 is shown the front axle member 10, in the present instance comprising two opposed channel members 11, which are bolted to the wheel hubs 12 by means of the plural bolt members 13. Also bolted to the axle by means of the plural bolt members 14 is a bracket 15, which is apertured as at 16 to receive the pivot bolt adapted to connect the bolster with the axle. Conventional steel wheels 17 are secured to the axle hubs in any manner desired.

Fixedly secured to the upper side of the axle 11 is a fifth wheel member or ring 18, which is shown in Fig. 4 as a partially round portion, held in a secure manner with respect to the axle by means, as shown in Fig. 4, of rearwardly extending straps 19 bolted at one end to the under part of the axle and at the opposite end to the ring itself.

The forward ends of ring 18 are bolted, as at 20, to the angle iron hound 21, which in turn, by means of plural connecting members, is fixedly secured to the axle.

In Fig. 5, the ring 18 is shown as a complete circular member and secured in the same manner to the axle.

It might be stated that as far as the operation of the present device is concerned, it is immaterial whether the ring is broken or not, although in some instances it may be advisable to have the complete ring when the axle member is adapted to have a greater than usual turning movement.

The wagon frame or bolster 22, which in the present instance comprises a steel I-beam has intermediate its length and secured thereto in a fixed manner, a bracket 23 which carries the conventional king bolt 24. It is apparent that the bolster is suspended immediately above the axle, and that the king bolt has its lower end depending through aperture 16 in the bracket 15 secured to the axle.

As far as the present invention is concerned, it is immaterial how far the wagon bolster is suspended above the axle and intermediate portions may be disposed between the bolster and axle, if desired.

Means for suspending the bolster in a non-tipping relation to the axle is provided in the following portions: Dual detachable lugs or non-tipping members are shown at 25. They are shown in detail in Fig. 8 and comprise metal members cut away as at 26 to receive the lower side of the I-beam bolster and are also connected in a detachable manner with the bolster by means of the plural bolt members 27. These lugs are disposed upon either side of the bolster or wagon frame and have their lower sides riding upon the before mentioned ring 18, with the result that irrespective of the turning movement of the axle, induced by the wheel 17, the lugs will at all times ride upon the fixed ring 18 and therefore maintain the bolster in a non-tipping relationship with the axle.

In view of the above detail description, it is not thought necessary to go into further detail with respect to the operation of the device and it is definitely stated that the novelty in the present application lies specifically in the manner of assembly of the bolster with the axle member in a non-tipping relationship.

What I claim is:

A steel truck including in combination a steel axle, a circular ring attached to and rigidly braced upon said axle, a steel bolster pivotally related to said axle and means for maintaining the bolster in a suspended and non-tipping relationship to the axle, irrespective of the angular position of the bolster upon the axle, said means including lugs secured to the bolster and riding at all times upon said ring, and means for detachably connecting the lugs to said bolster.

In testimony whereof I have hereunto affixed my signature.

DANIEL W. VOORHEES, Jr.